(12) United States Patent
Grabau et al.

(10) Patent No.: US 9,759,186 B2
(45) Date of Patent: Sep. 12, 2017

(54) VORTEX GENERATOR UNIT FOR A WIND TURBINE BLADE

(71) Applicant: Envision Energy (Denmark) ApS, Silkeborg (DK)

(72) Inventors: Peter Grabau, Silkeborg (DK); Kristian Godsk, Ry (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 105 days.

(21) Appl. No.: 14/801,028

(22) Filed: Jul. 16, 2015

(65) Prior Publication Data

US 2016/0017864 A1    Jan. 21, 2016

(30) Foreign Application Priority Data

Jul. 16, 2014 (DK) .............................. PA 2014 70449

(51) Int. Cl.
*F03D 1/06* (2006.01)

(52) U.S. Cl.
CPC .......... *F03D 1/0675* (2013.01); *F03D 1/0633* (2013.01); *F05B 2230/50* (2013.01); *F05B 2230/604* (2013.01); *F05B 2240/122* (2013.01); *Y02E 10/721* (2013.01); *Y02P 70/523* (2015.11)

(58) Field of Classification Search
CPC ............ F05B 2240/122; F05B 2250/11; F05B 2250/13; F05B 2230/50; F05B 2240/21; Y02E 10/721; Y02P 70/523; F03D 1/0675; F03D 1/0633
See application file for complete search history.

(56) References Cited

U.S. PATENT DOCUMENTS

| 8,047,801 | B2 | 11/2011 | Fang et al. |
| 8,678,746 | B2 | 3/2014 | Haag |
| 8,746,053 | B2 * | 6/2014 | Brake .................. F03D 1/0608 73/147 |
| 9,499,309 | B2 * | 11/2016 | Zerfas .................... B65D 75/44 |
| 2011/0142673 | A1 | 6/2011 | Fang et al. |

(Continued)

FOREIGN PATENT DOCUMENTS

| EP | 2 597 300 A1 | 5/2013 |
| WO | 2007/140771 A1 | 12/2007 |

(Continued)

*Primary Examiner* — Nathaniel Wiehe
*Assistant Examiner* — Elton Wang
(74) *Attorney, Agent, or Firm* — James Creighton Wray; Meera P. Narasimhan

(57) ABSTRACT

A wind turbine blade vortex generator unit and a method for installing it, where a wind turbine blade has at least one series of vortex generator units formed of fins extending substantially perpendicular to the surface of the airfoil and substantially in a direction from the leading edge towards the trailing edge of the wind turbine blade. The vortex generator units each comprises a fin connected to an outer side of the fin base, and where the fin is delta shaped tapering from a trailing edge towards a leading edge and where each of the vortex generator units has a layer of adhesive on an inner side of the base that extends to an outermost periphery of the base. The vortex generator unit has exactly one fin, and the base has an airfoil shaped periphery with a rounded leading edge and a trailing edge.

10 Claims, 5 Drawing Sheets

(56) References Cited

U.S. PATENT DOCUMENTS

| | | | |
|---|---|---|---|
| 2012/0189444 A1* | 7/2012 | Haag | F03D 1/0633 |
| | | | 416/9 |
| 2012/0201689 A1 | 8/2012 | Fuglsang et al. | |
| 2012/0257977 A1 | 10/2012 | Jensen et al. | |
| 2012/0257978 A1* | 10/2012 | Jensen | F03D 1/0608 |
| | | | 416/223 R |
| 2014/0328692 A1* | 11/2014 | Riddell | F03D 1/0675 |
| | | | 416/236 R |
| 2014/0328693 A1* | 11/2014 | Wilson | F01D 5/02 |
| | | | 416/236 R |

FOREIGN PATENT DOCUMENTS

| | | |
|---|---|---|
| WO | 2013/060493 A1 | 5/2013 |
| WO | 2013/060722 A1 | 5/2013 |

\* cited by examiner

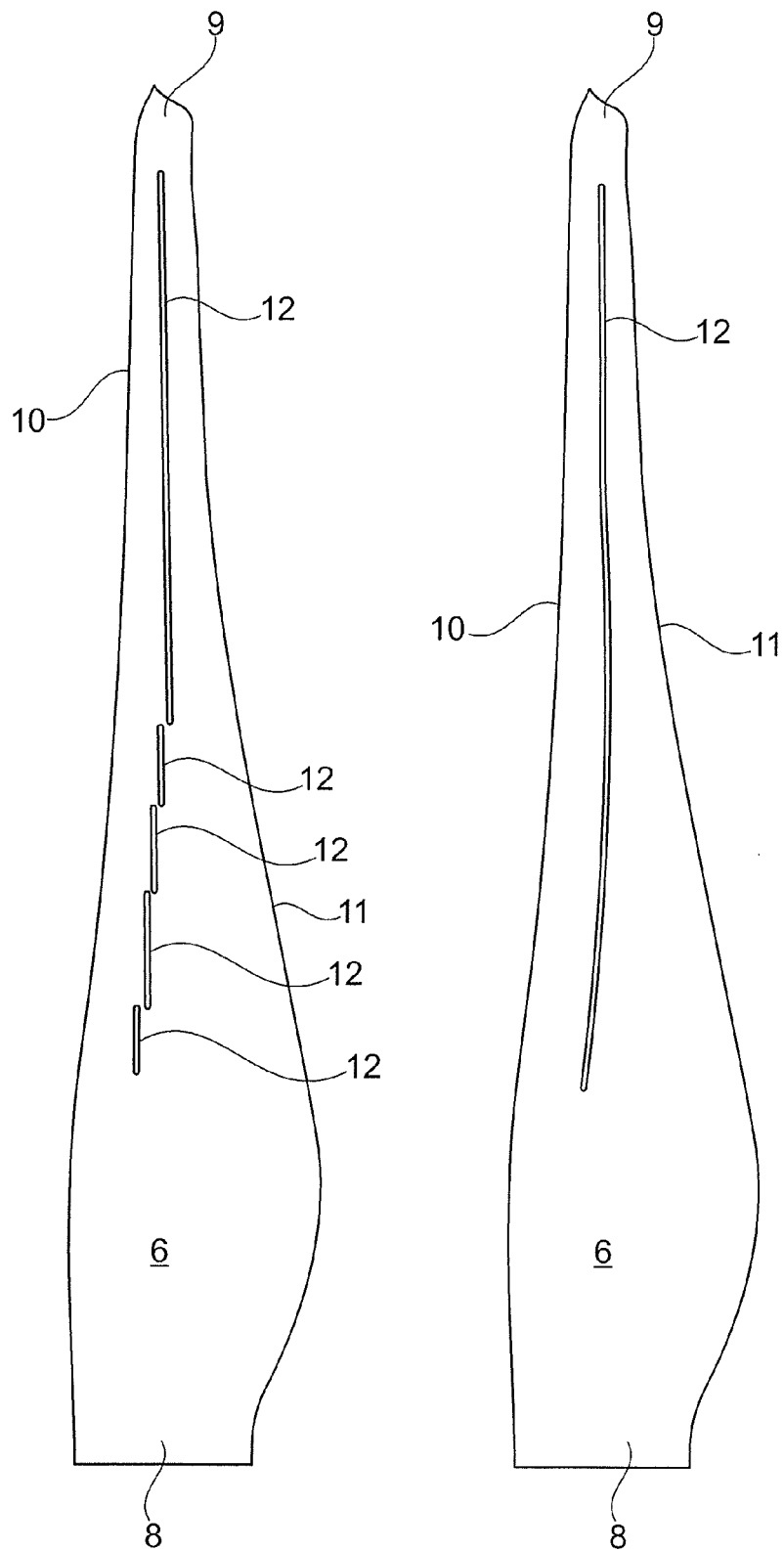

VORTEX GENERATOR UNIT FOR A WIND TURBINE BLADE

BACKGROUND OF THE INVENTION

Field of the Invention

The present invention relates to a wind turbine blade vortex generator unit for a wind turbine blade, where said wind turbine blade comprises at least a root end, a distal tip end, a pressure side and a suction side, where said pressure side and said suction side constitute an aerodynamic profile with a leading edge and a trailing edge, hereinafter referred to as an airfoil, and where said wind turbine blade comprises at least one series of vortex generator units, comprising fins extending substantially perpendicular to the surface of said airfoil and substantially in a direction from the leading edge towards the trailing edge of the wind turbine blade, where said fins have a height measured perpendicular from a base having a width and a thickness and to a free end, where the vortex generator units each comprises a fin connected to an outer side of said base, and where said fin is tapered from a trailing edge side towards a leading edge side and thus appears delta shaped, and where each of said vortex generator units further comprises a layer of adhesive on an inner side of said base, extending in a base plane.

Description of Related Art

The present invention also relates to a method for installing a series of vortex generator units at a wind turbine blade, and even further to a wind turbine blade comprising such a vortex generator unit.

The development of more cost-effective wind turbines means that the size and height of wind turbines have an increasing role. The size of wind turbine blades has been increased over years and still is. Designing an effective blade becomes more and more difficult as the blades become longer and wider and because of the fact that the blades have to be optimized to quite a span in wind speeds and to other factors that might have influence on the performance of a specific aerodynamic profile. Therefore, there remains a need for improving the aerodynamic properties of wind turbine blades according to specific needs. Such needs will typically be calculated either theoretical or on behalf of specific measurements, but also measurements alone can be used as input for performing improvements.

Wind turbine blades typically comprise an airfoil shaped shell which is supported by using internal reinforcement structures. The airfoil shape and the internal structure of a wind turbine blade will typically be designed as effective as possible but still with an eye to as low energy cost (COE) as possible in a particular target market (wind range and environmental requirements).

The design of the airfoil shape of a wind turbine blade is thus a trade-off between power production, structural mass and cost, induced loads, noise and transport considerations. As a consequence of this, the efficiency of the blades are very often also a trade-off as it is costly to manufacture and time consuming to design and manufacture molds for each and every specific blade condition. Thus, blades are designed, molds are prepared and blades are manufactured in order to be as close to optimum as possible.

To obtain a closer to optimum solution, it is known to attach different devices, such as vortex generators, gurney flaps, and trailing edge extender in form of a tape, to the wind turbine blade, in order to make the trade-offs less problematic and thus make a specific blade design perform better under specific conditions.

Vortex generators, as well as gurney flaps, are used to optimize the aerodynamic performance, and a trailing edge extender made from tape will reduce noise generated from the blade. Such tape is so flexible that it has no capacity to redirect the air flow passing over the blade, and hence it has no impact on the lift coefficient of the blade profile.

From U.S. Patent Application Publication 2012/0257977 A1 a vortex generator comprising two fins is known where the base of the vortex generator comprises a recess for an adhesive pad to be mounted. This should apparently solve the problem from the prior art solutions of having to seal along the perimeter of the base. In order to allow the adhesive pad to be put in contact with the surface of a wind turbine blade, the recess is a little less deep than the thickness of the adhesive pad. This will evidently leave a narrow gap along the perimeter of the base.

International Patent Application WO 2007/140771 A1 and corresponding U.S. Pat. No. 8,678,746 disclose a strip having one or more vortex generators where the base of the strip has the same width at the leading and trailing edges of the projecting fin. This wide frontal edge of the base will disrupt the air flow in the boundary layers around the vortex generator, thereby reducing the effect of the vortex generator.

SUMMARY OF THE INVENTION

An object of this invention is to provide a wind turbine blade comprising a number of vortex generator units. A further object of this invention is to provide a method for arranging and installing such vortex generator units. An object of the invention is also to provide a vortex generator unit for a wind turbine blade. An even further object of the invention is to provide a vortex generator that has a large degree of freedom related to the position of one or more vortex generator units and where the influence of one or more vortex generator units on other vortex generator units can be individually adapted. It is, in other words, an object of the invention to provide a solution that will enhance the aerodynamic performance of a wind turbine blade, at a specific wind turbine, where the production of the specific wind turbine has room for improvement.

As also mentioned above, the invention concerns a wind turbine blade vortex generator unit for a wind turbine blade, where said wind turbine blade comprises at least a root end, a distal tip end, a pressure side and a suction side, where said pressure side and said suction side constitute an aerodynamic profile with a leading edge and a trailing edge, hereinafter referred to as an airfoil, and where said wind turbine blade comprises at least one series of vortex generator units comprising fins extending substantially perpendicular to the surface of said airfoil and substantially in a direction from the leading edge towards the trailing edge of the wind turbine blade, where said fins have a height measured perpendicular from a base having a width and a thickness and to a free end, where the vortex generator units each comprises a fin connected to an outer side of said base, and where said fin is tapered from a trailing edge side towards a leading edge side and thus appears delta shaped, and where each of said vortex generator units further comprises a layer of adhesive on an inner side of said base which layer of adhesive extends in a base plane.

The new and inventive characteristic of such a wind turbine vortex generator unit is that said layer of adhesive extends to an outermost periphery of the base of said vortex generator unit, where the vortex generator unit comprises exactly one fin, and where the base of said vortex generator unit, in the base plane, has an airfoil shaped periphery comprising a rounded leading edge and a trailing edge.

Having the adhesive extending to the outer most edge makes any additional sealing along the perimeter of the base unnecessary as with prior art solutions, and further there is no gap (not even a narrow gap) between the base and the surface of the wind turbine blade. No matter how small a gap is found, there will evidently be dirt and debris, such as sand and insects, that over time will fill the gap and then will cause the vortex generator units to become loose and eventually to fall off—also called the peeling effect.

If the wind turbine is operated in areas where the temperature drops below the freezing point, this can be a problem as any wet dirt or debris will expand when frozen, and thus the vortex generator unit will be lifted from the surface of the wind turbine blade. Also wind turbines placed in warmer conditions face problems as described above. The environment across wind turbine blades is very harsh and it is very crucial if, e.g., the applied vortex generators have a tendency to become loose, but over time the mentioned conditions will cause vortex generators to be loosened and to fall off due to the "peeling effect". These drawbacks are prohibited by arranging an adhesive to the absolute outermost edge of the base of a vortex generator unit as nothing then can wedge itself in between the base and the surface. The adhesive will of cause be manufactured from a UV resistant material, and further the adhesive will have only a minimum thickness in order to provide a good and strong adhesion that still can be adapted to the curved surface of a wind turbine blade due to elasticity in the adhesive and/or in the base of the vortex generator unit.

A vortex generator unit comprising exactly one fin has the benefit of being 100% independent as said one fin will be able to be placed in any position in relation to other vortex generator units as well as in relation to no other vortex generators. Known vortex generator units typically comprise a panel, where one panel comprises a number of vortex generating fins and is typically arranged in pairs of two fins, and where one panel comprises four or more pairs, and even up to ten pairs of fins are common. Using such panels do not allow for a more individual and adapted placement of the vortex generator units as the panels will be arranged in one single row, very often in pre-manufactured cut outs/recesses in the surface of the wind turbine blades. The positions of the vortex generators are thus determined by either the cut-outs or recesses or at least by the pairs of vortex generators at a panel, and not on behalf of individual measurements or individual needs. A panel comprising, e.g., ten pairs of fins will most probably/likely only have one pair of fins in an optimum position, whereas the rest of the pairs of fins on a panel will only be situated in a "nearly" optimum location. Using the invention, all vortex generator units may be arranged in a specific and selected position in order to help the wind turbine blade to produce more power.

The airfoil shaped periphery of the base comprising a rounded leading edge and a trailing edge has great influence on the aerodynamic properties of the vortex generator as the shape of the base will enhance the flow of passing air in the boundary layers along the airfoil shaped surface due to the shape of the base. The airfoil shaped periphery of the base may be designed according to known airfoil series such as NACA, SERI, or other suitable airfoil series.

By having an airfoil shaped base, the flow in the boundary layer is optimized, and by having the adhesive extending to the outermost periphery, the installation becomes "long lasting" and no sealing is required along the edge of the base and there is no narrow gap under the base as seen in U.S. Patent Application Publication US 2012/0257977 A1.

In an embodiment of a wind turbine blade vortex generator unit according to the invention, the base at the leading edge has a width (W-lead) in the base plane, and where the base at the trailing edge has a width (W-trail) in the base plane, and where W-lead is smaller than W-trail. Thus, the base is narrower at the leading edge than at the trailing edge of said base. The leading edge of the base is facing the leading edge area of the wind turbine blade, as well as the trailing edge of the base is facing the trailing edge area of the wind turbine blade. Both sides of the base may be shaped alike and thus be "mirrored" from one side to the other side, but the shape may also be like a pressure side at one side of the base and like a suction side at the other side of the base. The design depends on the specific needs for the individual vortex generator units.

A wind turbine blade vortex generator unit according to the invention may have a base with a rounded peripheral edge along the perimeter, where the base is rounded and, in general, convex on both sides of the base. The trailing edge of the base could however be shaped in a concave design in order to influence how the vortex is shaped at least around the base of the vortex generator unit. This can, in some situations, further have an impact on the overall performance of the vortex generator unit or units.

Furthermore, a wind turbine blade vortex generator unit according to the invention comprises a base that has a rounded/chamfered edge along the perimeter and in the direction of the thickness. This will make the influence of the vortex generator unit even smaller, as the thickness of the vortex generator unit that extends from the surface of the wind turbine blade becomes smaller and more aerodynamic.

In general, a vortex generator unit according to the invention comes in four different main designs, namely:
with a 5 mm high fin, a 14 mm wide base, a 22 mm long base and a 0.5 mm thick base,
with a 10 mm high fin, a 14 mm wide base, a 22 mm long base and a 0.5 mm thick base,
with a 20 mm high fin, a 28 mm wide base, a 44 mm long base and a 1.0 mm thick base,
with a 30 mm high fin, a 28 mm wide base, a 44 mm long base and a 1.0 mm thick base.

Such four standard sizes of vortex generator units according to the invention cover the need for wind turbine blades as the optimum height of the fins of a vortex generator varies along the length of a blade. It is, e.g., very common to use higher fins close to the root end and lower fins close to the tip end, which of cause can vary depending on the specific conditions for the wind turbine blade in question.

On the inner side of the base there will typically be arranged an adhesive pad, such as a double adhesive tape, but a viscous adhesive mass can also be used and applied at the base of one or more vortex generator units. The adhesive will typically have a thickness of 0.4 to 0.7 mm.

All measurements given above may have a tolerance of ±1 to 20%, ±1 to 15%, ±1 to 10%, ±1 to 5%. It shall, however, be understood that the size of the different parts of a vortex generator unit may be calculated or otherwise determined to values in between the mentioned values, but due to production costs and logistics there will be a number of standard variants to choose between, as mentioned above, and that the most suitable model will be used in order to gain the most from the vortex generator unit or units.

In an embodiment of a wind turbine blade vortex generator unit according to the invention, the inner side of the base comprises a surface treatment between the base itself and the adhesive, where the surface treatment is at least one of the following: a layer of primer, a plasma treatment, a corona treatment, an abrasive treatment, and where the adhesive is one of the following: a viscous adhesive mass, a double adhesive pad/tape. The surface treatment may thus be a layer of primer that is applied at the inner side of the base by any suitable method, such as by using a brush, a roller or a spray can, but the surface treatment may also comprise a kind of imaginary layer such as a treatment using an electric arc in order to establish a better adhesion between the base and the adhesive used.

The adhesive will typically be a double adhesive tape added to the vortex generator unit and with a backing tape on the surface intended for adhesion to the surface of a wind turbine blade, but other types of adhesive will also be possible.

The invention also comprises a method for installing a series of vortex generator units, according to the description above, at a wind turbine blade where at least one series of vortex generator units are installed in a position relative to the trailing edge and to the tip end of the wind turbine blade. The vortex generator units may be installed in a line extending at a certain distance from the trailing edge, but the vortex generator units may also be installed in various distances, e.g., from said trailing edge. As an example, fifty vortex generator units may be installed in a continuous line from the tip end towards the root end of a wind turbine blade. The next, e.g., twenty vortex generator units may be installed in another continuous line in another distance in relation to the trailing edge, or e.g., to the leading edge. Even further sets of vortex generator units may be arranged at different locations and thus forming a stepped line of vortex generator units along a certain distance of a wind turbine blade. One of said steps may thus comprise only one vortex generator unit, but will typically comprise a number of vortex generator units.

Installing the vortex generator units in relation to the trailing edge and the tip end of a wind turbine blade is very attractive as the trailing edge and the tip end are very easy to define and to measure any position from. Further, it is very easy to position any tools along the trailing edge in order to either perform any marking or to arrange an installation tool as will be discussed below.

A method according to the invention comprises that a series of vortex generator units comprises exactly one vortex generator unit comprising exactly one fin. Having a series of only one single vortex generator unit, it becomes possible to install the units in a very unique pattern based on, e.g., measurements, calculations, simulations and experience, in order to obtain a better performance of a specific wind turbine blade at a specific wind turbine in a specific location. The positions of every single vortex generator unit can thus be very specific and precise. Comparing this option with the known methods of placing vortex generators, it becomes very clear that until now vortex generators have been placed more or less random in order to see, very often, small improvements. The main reason for this is that the vortex generators are placed in predetermined positions, which very often is based on experience and "gut feelings" of the persons involved. By performing very accurate measurements and calculations, which of cause will be based on a combination of facts and experience, a very target oriented solution can be reached with a minimum of downtime during installation of the desired types and sizes of vortex generator units. Improvements of up to 0.8%, 1.2% or even 1.5% are possible at many wind turbines, simply by arranging vortex generators in an optimized number and pattern according to the invention. Such an improvement will be cost neutral in a very short time—actually within very few days of operation there will be a measurable increase in production.

In a method according to the invention, at least one vortex generator unit may be installed with the fin in an acute angle in relation to the direction of the chord of the wind turbine blade in the specific position. The acute angle falls within the interval of 0 to 30 degrees, preferably within the interval of 0 to 15 degrees, more preferably within the interval of 0 to 7 degrees, even more preferably within the interval of 0 to 3 degrees in relation to the chord. The individual vortex generator units may be arranged with the same or with different acute angles and they may be arranged pairwise and pointed in the same or in the opposite direction. Further, the fin of a vortex generator may be tilted according to the base, meaning that the fin is NOT orthogonal to the base, and the thickness of the fin may be tapered from, e.g., 1.0 mm to 0.5 mm in order to have sufficient slip in a mold where the vortex generator typically will be molded.

A vortex generator unit according to the invention will typically be produced by an injection molding process from a polymer material having suitable properties, e.g., a marine grade polymer. Steel materials will also be very effective, as the base and fin can be made very thin and very effective. When using materials which are electrical conducting, it becomes necessary to address problems with regard to lightning, as lightning leaders will stretch out from such parts. A vortex generator will thus act as a lightning receptor as is very well known within the wind turbine blade business. Vortex generator units can of cause be connected to ground conducting wires and also fulfill this task.

According to a method according to the invention, at least one vortex generator may be arranged in an installation tool, e.g., in a fixture, where said tool comprises means for aligning said tool with at least one of: a marking on a wind turbine blade, a physical part of a wind turbine blade, e.g., the trailing edge, where said tool further comprises means for holding at least one vortex generator unit in a specific position during installation of said at least one vortex generator unit. The tool may comprise fixation means for one or more vortex generator units, e.g., up to thirty or forty vortex generators, where all the vortex generators in the tool are installed in one go and in relation to each other and in relation to physical measures on a wind turbine blade. Such measures will preferably be the distance from the trailing edge and from the tip end of a specific blade, as both the trailing edge and the tip end are rather easy to define and to measure from or to place the installation tool against. Such a blade may very well be a blade already installed at a wind turbine, meaning that a retrofitting is taking place. Installation may also take place as one of the last processes during manufacturing of a wind turbine blade. A portion of vortex generator units may be installed by using already installed vortex generator units as fix points for the next set of vortex generator units. An installation tool may, e.g., have one or more free holding means for a vortex generator unit, that can be placed over one or more already installed vortex generator units. This will allow vortex generator units to be installed in relation to the trailing edge of a wind turbine blade and in relation to other vortex generator units, whereby it becomes obvious that consecutive measurement from, e.g., the tip end is unnecessary as long as there is a relation to other vortex generator units.

A method according to the invention, where an installation tool is needed, may include that said installation tool comprises at least two, preferably 5, 10, 20, 30, 40 or even more means for holding a vortex generator unit, where the vortex generator units are arranged in a specific pattern in said means, e.g., in apertures in a resilient material, where adhesive means at the base of the individual vortex generators are prepared/applied, where the installation tool is operated and, thus, bringing the adhesive on the base of the vortex generator units in contact with the surface of a wind turbine blade in specific positions, where the installation tool is removed.

Hereafter, the individual vortex generator units may be manually checked for perfect adhesion, but the installation tool may also comprise means for applying a proper pressure on every single vortex generator. This can e.g. be achieved by fixating the installation tool to the surface of a wind turbine blade using suction cups and by applying a suitable pressure between the tool and the blade which will urge the base of the vortex generator and thus the adhesive material against the surface of the wind turbine blade.

The installation tool may be made from any kind of material, where the individual vortex generator units may be held in a specific and predetermined position by mechanical means or by friction or any other suitable, means. The tool may, e.g., be a plate shaped foam tool, where vortex generators are arranged in apertures in said foam until they are placed at a wind turbine blade surface. After adhesion, the tool will be removed by lifting it away from the surface and the adhesive will overcome the friction between the fins of the vortex generator units leaving them in position.

The invention further concerns a wind turbine blade comprising one or more vortex generator units according to the detailed description above, and even further, the invention also comprises a wind turbine blade comprising a series of vortex generator units installed according to the above-mentioned method.

By comparing the described invention with the known solutions, it will become clear to the skilled person that prior art solutions in general have been a kind of "wild guesses" based on rather little experience and "gut feelings" and where a large degree of compromises and coincidences has been very common.

Taking the job of calculating and measuring to a higher level and even more serious, quite a benefit will become visible and installation of vortex generator units, according to the invention, will be very attractive as performance of the wind turbines will increase.

The invention is described by example only and with reference to the drawings.

BRIEF DESCRIPTION OF THE DRAWING

FIG. 5 shows a wind turbine blade comprising a number of vortex generator units in a discontinuous line;
FIG. 6 shows a wind turbine blade comprising a number of vortex generator units in a continuous line.

DETAILED DESCRIPTION OF THE INVENTION

In the following text, the figures will be described one by one, and the different parts and positions seen in the figures will be numbered with the same numbers in the different figures. Not all parts and positions indicated in a specific figure will necessarily be discussed together with that figure.

Figure 1:
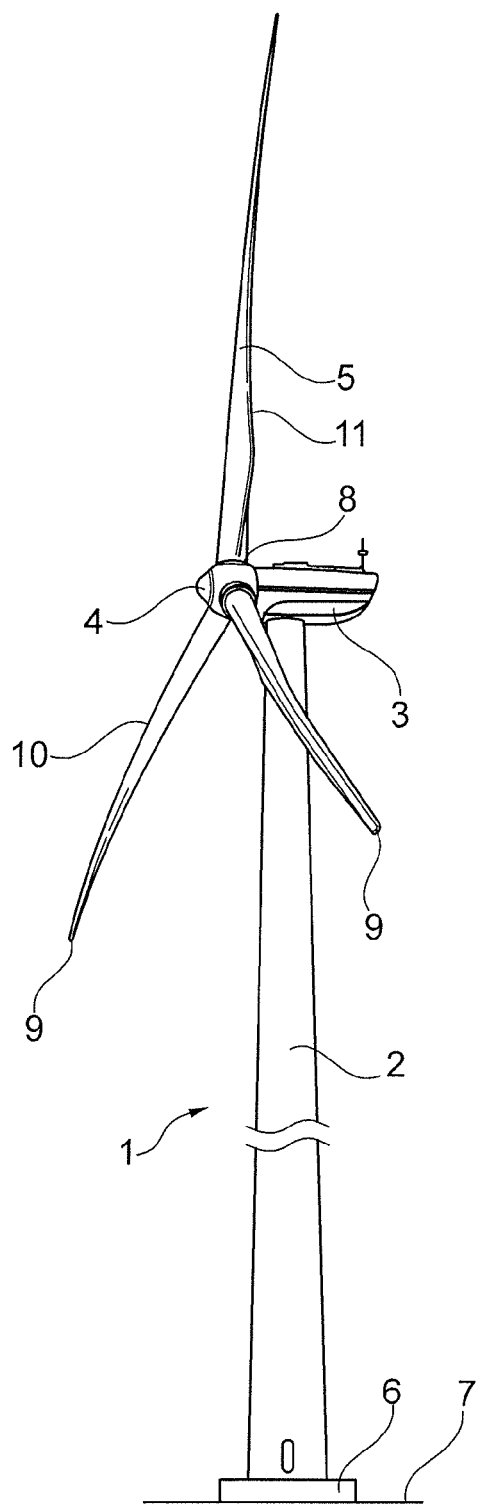
FIG. 1 is a perspective view of a wind turbine.

FIG. 1 shows a wind turbine 1 comprising a wind turbine tower 2 and a nacelle 3 mounted at the top of the wind turbine tower 2, e.g., via a yaw system. The wind turbine tower 2 may comprise one or more tower sections mounted on top of each other. A rotor hub 4 is rotatably mounted to the nacelle 3 via a rotor shaft. Three wind turbine blades 5 are mounted to the rotor hub 4 so that they form a rotor plane as the wind turbine blades 5 extends radially outwards from said rotor hub 4. The wind turbine tower 2 is mounted onto a foundation 6 extending above a ground level 7.

The wind turbine blade 5 comprises a first end/blade root 8 configured to be mounted to the rotor hub 4. The wind turbine blade 5 also comprises a second end/tip end 9 arranged at the free end of the blade 5. The wind turbine blade 5 has an aerodynamic profile along the length of the blade comprising a leading edge 10 and a trailing edge 11. The wind turbine blade 5 may comprise a number of integrated support structures, e.g., spar caps and shear webs, arranged along the length of the aerodynamic profile.

Figure 2:
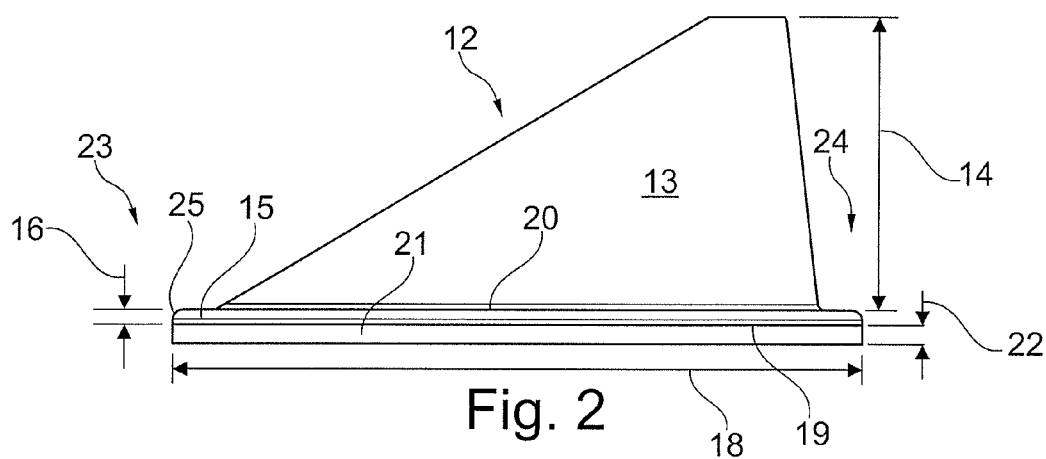
FIG. 2 is a side view of a vortex generator unit.

FIG. 2 shows a side view of a vortex generator unit 12, comprising a fin 13 having a fin height 14, a base 15 having a base thickness 16, a base width 17 (FIG. 4), and a base length 18. The base 15 further comprises an inner side 19 of the base 15 and an outer side 20 of the base 15. At the inner side 19 of the base 15 there is arranged an adhesive 21, having an adhesive thickness 22 extending over the full base 15. The base length 18 extends from the leading edge 23 of the vortex generator unit 12 to the trailing edge 24 of the unit 12 and the fin 13 is tapered from the area of the trailing edge 24, where the fin 13 has full height 14, to the area of the leading edge 23. The base 15 has a rounded/chamfered edge 25 along the perimeter and in the direction of the thickness.

Figure 3:
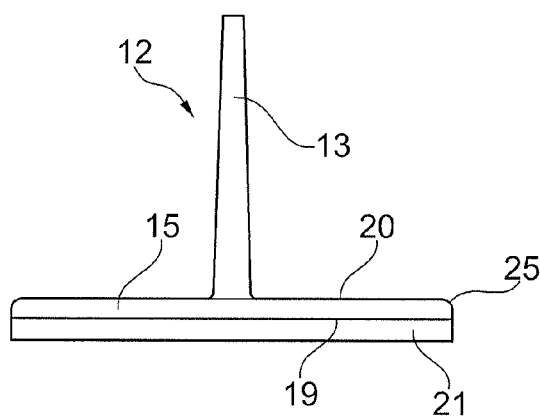
FIG. 3 is an end view of a vortex generator unit.

In FIG. 3, an end view of a vortex generator unit 12 is shown where it is clearly seen that the thickness of the fin 13 is tapered from the base 15 towards the top. This is due to slip in the mold during production, but also in order to obtain the best vortex, as a very thin fin will enhance the performance of a vortex generator unit. It is however a balance between aerodynamic performance and structural performance.

Figure 4:
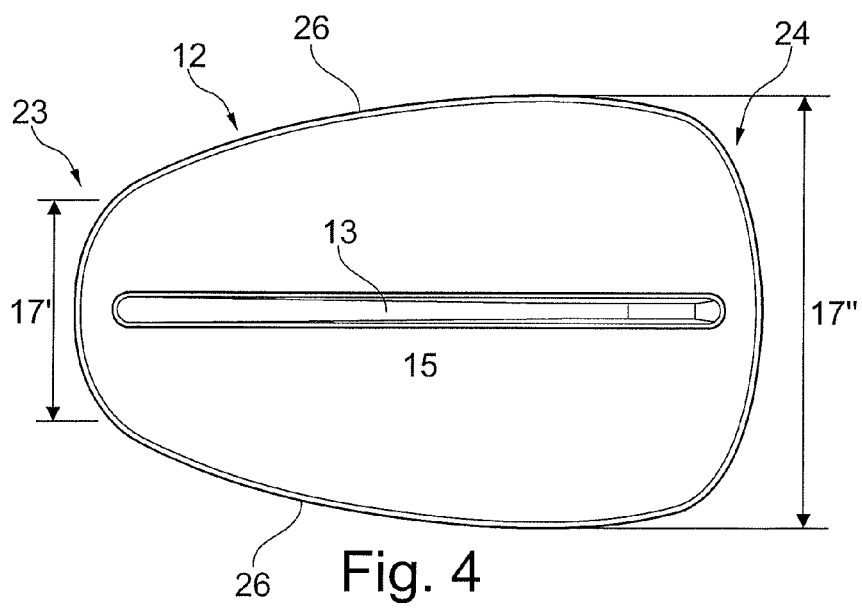
FIG. 4 is a top view of a vortex generator unit.

FIG. 4 shows a top view of a vortex generator unit 12, where the base 15 has a rounded peripheral edge 26. The shape is designed according to known airfoil series, such as NACA, SERI, or other suitable airfoil series. In this embodiment, the base is symmetrical on both sides of the fin 13, where the shape corresponds to the suction side of a specific NACA profile which is calculated to give an optimum aerodynamic behavior when the vortex generator unit 12 is installed and in use. The vortex generator unit 12, as seen in FIG. 4, has a base 15 having a width 17' (W-lead) at the leading edge 23 and a width 17" (W-trail) at the trailing edge, where W-lead 17' is smaller than W-trail 17".

FIG. 5 shows a wind turbine blade 6 comprising a number of vortex generator units 12 arranged in a discontinuous line. In this example, the vortex generator units are arranged as a series of individual vortex generator units as seen by the "steps" in the line of vortex generator units 12. In a more specific arrangement, the individual vortex generator units 12 could be arranged individually, but individually and pair-wise will be more common, and thus, the wind turbine blade 6 would be covered with even more widely spread vortex generator units 12 giving a boost to the performance of a wind turbine blade.

FIG. 6 shows a wind turbine blade 6 comprising a number of vortex generator units 12 arranged in a continuous line, where the units 12 are installed in relation to the tip end 9 and the trailing edge 11 of the wind turbine blade 6. The vortex generator units 12 seen in FIG. 5 are also arranged in relation to the tip end 9 and the trailing edge 11 of the wind turbine blade 6.

Figure 7:
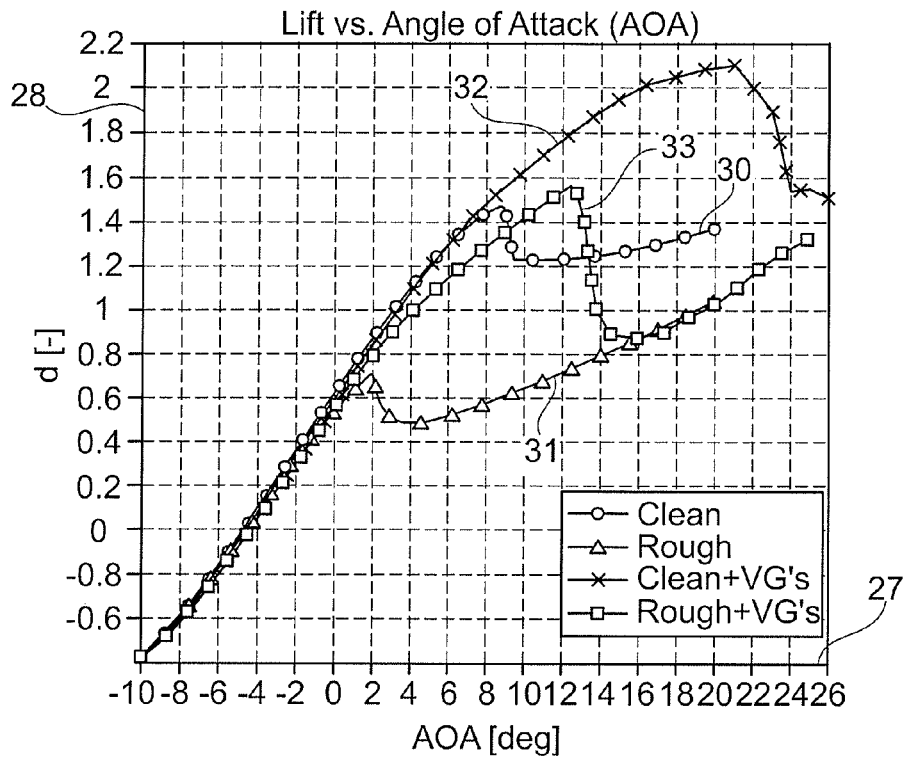
FIG. 7 is a performance diagram of Lift vs. Angel of Attack (AOA)

FIG. 7 shows a performance diagram of Lift vs. Angle of Attack (AOA), where different situations are depicted. The x-axis 27 shows angle of attack (AOA) and the y-axis 28 shows the lift. The first graph 30 shows the result for a wind turbine blade 6 having a clean/smooth surface and without any vortex generator units 12. The second graph 31 shows the result for a wind turbine blade 6 having a rough/dirty surface and without any vortex generator units 12. By comparing these two graphs 30, 31, it becomes quite clear that the lift performance is rather sensitive to a rough/dirty surface, especially with increasing angle of attack. It is, however, practically impossible to have a clean and smooth surface of a wind turbine blade for a longer period as debris and insects evidently will attach to the blade surface and build up a rough layer, and thus, lower the production of the wind turbine blade/wind turbine. Because of this fact, it is quite common to clean the wind turbine blade on a regular basis to enhance the production, even though it is an expensive operation.

The third graph 32 shows the result for a wind turbine blade 6 having a clean/smooth surface but WITH vortex generator units 12 according to the invention. The difference between the third graph 32 and the first graph 30 is the pure effect of using vortex generator units 12. The fourth graph 33 shows the result for a wind turbine blade 6 having a rough/dirty surface but WITH vortex generator units 12 according to the invention. Now, comparing the second graph 31 with the fourth graph 33, namely where wind turbine blade 6 has a rough and dirty surface without and with vortex generator units 12 respectively, a very distinct improvement of the generated lift is seen which will lead to an attractive and higher performance of the wind turbine. Using the vortex generator units according to the invention thus makes it possible to "move" the intervals of cleaning and servicing the wind turbine blades 6, and thus, to prolong said intervals.

Figure 8:
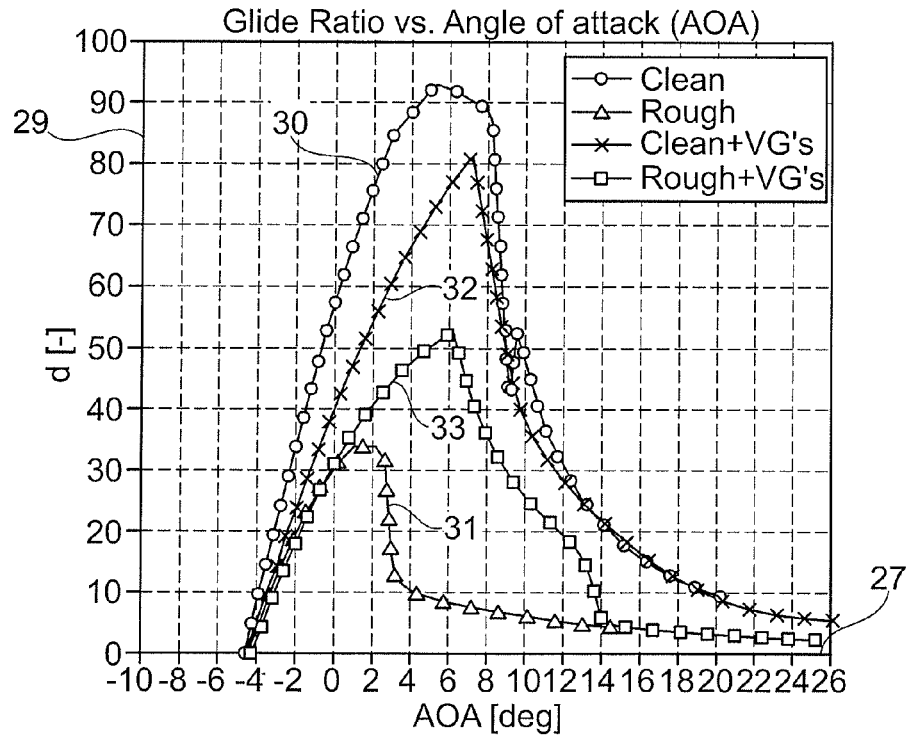
FIG. 8 is a performance diagram of Glide Ratio vs. Angel of Attack (AOA)

FIG. 8 shows a performance diagram of Glide Ratio vs. Angle of Attack (AOA), where different situations are depicted. The x-axis 27 shows angle of attack (AOA) and the y-axis 29 shows the glide ratio. The first graph 30 shows the result for a wind turbine blade 6 having a clean/smooth surface and without any vortex generator units 12. The second graph 31 shows the result for a wind turbine blade 6 having a rough/dirty surface and without any vortex generator units 12. By comparing these two graphs 30, 31, it becomes quite clear that also the glide ratio is rather sensitive to a rough/dirty surface as there is a large difference between the two graphs, especially with increasing angle of attack. It is, as mentioned above, practically impossible to have a clean and smooth surface of a wind turbine blade 6 for a longer period as debris and insects evidently will attach to the blade surface and build up a rough layer, and, thus, lower the production of the wind turbine blade/wind turbine. Because of this fact, it is quite common to clean the wind turbine blade on a regular basis to enhance the production, even though it is an expensive operation.

The third graph 32 shows the result for a wind turbine blade 6 having a clean/smooth surface but WITH vortex generator units 12 according to the invention. The difference between the third graph 32 and the first graph 30 is the pure effect on the glide ratio of using vortex generator units 12 which actually will lower the glide ratio to some extent. The fourth graph 33 shows the result for a wind turbine blade 6 having a rough/dirty surface but WITH vortex generator units 12 according to the invention. Now, comparing the second and fourth graphs 31, 33, it becomes clear that the glide ratio is higher, and thus, that the performance of a wind turbine blade 6 is higher when using vortex generator units 12. What is even more interesting to see is that the difference between the second graph 31 and the fourth graph 33, namely where the wind turbine blade 6 has a rough and dirty surface without and with vortex generator units respectively, is rather large. Here, we see a very distinct improvement of the glide ratio which also will lead to an attractive and higher performance of the wind turbine. Again, this shows that using the vortex generator units according to the invention makes it possible to "move" the intervals of cleaning and servicing the wind turbine blades 6, and thus, to prolong said intervals or simply to have a better overall performance.

The reason for studying especially the second graph 31 and the fourth graph 33 in the two above situations is that these graphs depict the case where the blade is dirty which it evidently will be even after only a short period of time after cleaning. It is, however, clear that a clean and smooth surface will give the best performance, but it is also clear that a clean and smooth blade only exists in theory or at least only for a very limited period of time.

Figure 9:
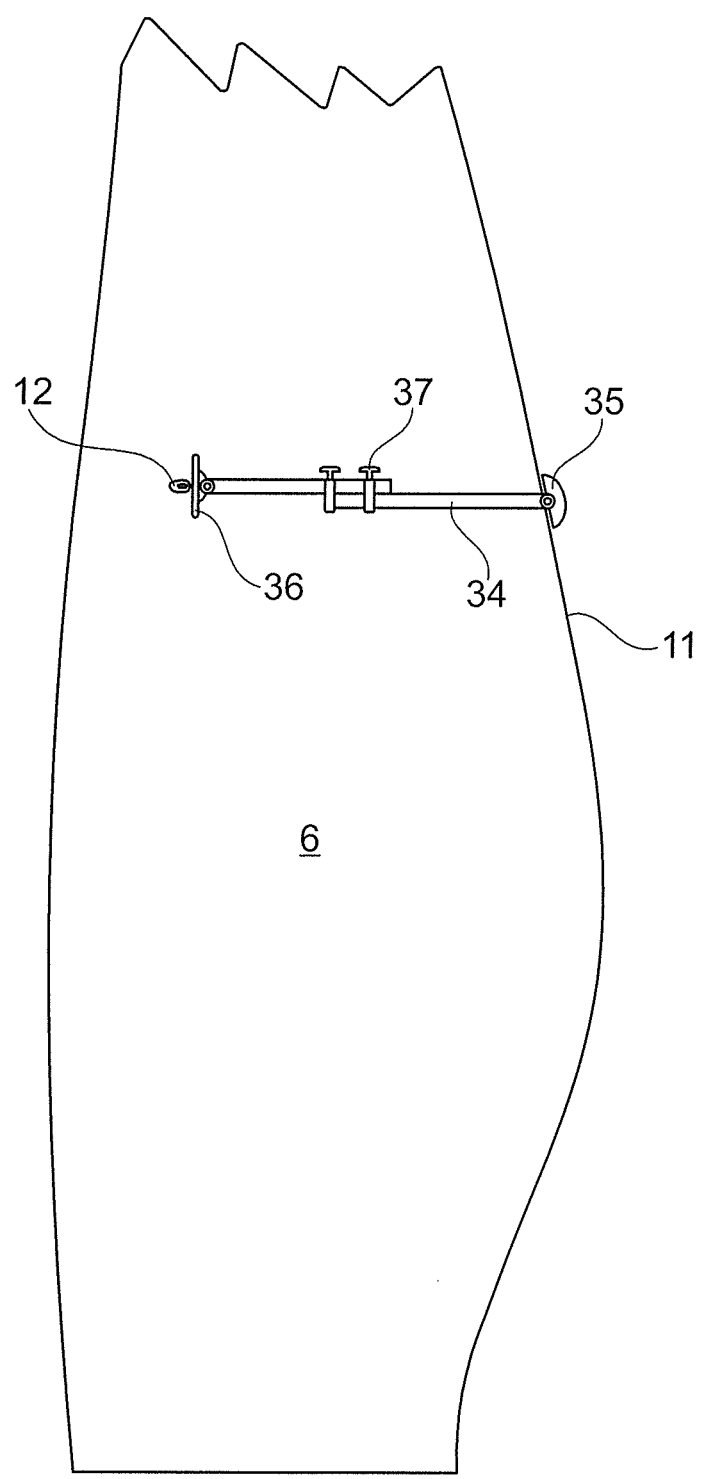
FIG. 9 shows an installation tool for vortex generator units.

FIG. 9 shows a part of a wind turbine blade 6 where an installation tool 34 for vortex generator units 12 is used. The installation tool 34 comprises adjustable aligning means 35 for engaging the trailing edge 11 of the wind turbine blade 6. The aligning means 35 could also be used for aligning the installation tool 34 along a marking on the blade surface. The installation tool 34 also comprises holding means 36 for holding a number of vortex generator units 12 in a specific position/angle during installation of the vortex generator units 12. Further, the installation tool 34 also comprises adjustment means 37 for adjusting the distance from the aligning means 35 to the holding means 36.

What is claimed is:

1. A wind turbine blade vortex generator unit for a wind turbine blade, where said wind turbine blade comprises at least a root end, a distal tip end, a pressure side and a suction side, where said pressure side and said suction side constitute an aerodynamic profile with a leading edge and a trailing edge, and where said wind turbine blade comprises at least one series of vortex generator units, each of which has a fin extending substantially perpendicular to the surface of said aerodynamic profile and substantially in a direction from the leading edge towards the trailing edge of the wind turbine blade, where said fin has a height measured perpendicular from a base having a width and a thickness and a free end, where the fin is connected to an outer side of said base, and where said fin is delta shaped tapering from a trailing edge side towards a leading edge side and where each of said vortex generator units further comprises a layer of adhesive on an inner side of said base, extending in a base plane, wherein said layer of adhesive extends to an outermost periphery of the base of said vortex generator unit, where the vortex generator unit comprises exactly one fin, and where the base of said vortex generator unit, in the base plane, has an airfoil periphery with the leading edge and the trailing edge being rounded and has rounded peripheral edges connected between the rounded leading edge and the rounded trailing edge, wherein the base at the leading edge has a width, W-lead, in the base plane, and where the base at the trailing edge has a width, W-trail, in the base plane, and where W-lead is smaller than W-trail.

2. A wind turbine blade vortex generator unit according to claim 1, wherein the base has a rounded peripheral edge along the perimeter.

3. A wind turbine blade vortex generator unit according to claim 1, wherein the base has a rounded/chamfered edge along the perimeter in the direction of the thickness.

4. A wind turbine blade vortex generator unit according to claim 1, wherein the inner side of the base comprises a surface treatment between the base itself and the adhesive, where the surface treatment is at least one of the following: a layer of primer, a plasma treatment, a corona treatment, an abrasive treatment, and where the adhesive is one of the following: a viscous adhesive mass, a double adhesive pad/tape.

5. A method for installing a series of vortex generator units for a wind turbine blade, where said wind turbine blade comprises at least a root end, a distal tip end, a pressure side and a suction side, where said pressure side and said suction side constitute an aerodynamic profile with a leading edge and a trailing edge, and where said wind turbine blade comprises at least one series of vortex generator units, each of which comprises a fin extending substantially perpendicular to the surface of said aerodynamic profile and substantially in a direction from the leading edge towards the trailing edge of the wind turbine blade, where said fin has a height measured perpendicular from a base having a width and a thickness and a free end, where the fin is connected to an outer side of said base, and where said fin is delta shaped tapering from a trailing edge side towards a leading edge side and where each of said vortex generator units further comprises a layer of adhesive on an inner side of said base, extending in a base plane, wherein said layer of adhesive extends to an outermost periphery of the base of said vortex generator unit, where the vortex generator unit comprises exactly one fin, and where the base of said vortex generator unit, in the base plane, has an airfoil periphery comprising a rounded leading edge and a rounded trailing edge and has rounded peripheral edges connected between the rounded leading edge and the rounded trailing edge, the method comprising the steps of installing the at least one series of vortex generator units on the surface of said wind turbine blade in a position between the trailing edge and the tip end of the wind turbine blade.

6. A method according to claim 5, wherein at least one vortex generator unit is installed with the fin in an acute angle in relation to the direction of a chord of the wind turbine blade.

7. A method according to claim 5, wherein said series of vortex generator units comprises exactly one vortex generator unit comprising exactly one fin.

8. A method according to claim 7, wherein said at least one vortex generator is arranged in an installation tool, where said tool comprises an aligner for aligning said tool with at least one of: a marking on a wind turbine blade, a physical part of a wind turbine blade, where said tool further comprises means for holding at least one vortex generator unit in a specific position during installation of said at least one vortex generator unit.

9. A method according to claim 8, wherein said installation tool comprises at least two holders for holding a vortex generator unit, comprising the further steps wherein: the vortex generator units are arranged in a specific pattern in said means, adhesive means are applied at the base of the individual vortex generators the installation tool is operated so as to bring the adhesive on the base of the vortex generator units in contact with the surface of a wind turbine blade, and then the installation tool is removed.

10. A wind turbine blade comprising a vortex generator unit, where said wind turbine blade comprises at least a root end, a distal tip end, a pressure side and a suction side, where said pressure side and said suction side constitute an aerodynamic profile with a leading edge and a trailing edge, and where said wind turbine blade comprises at least one series of vortex generator units, each of which has a fin extending substantially perpendicular to the surface of said aerodynamic profile and substantially in a direction from the leading edge towards the trailing edge of the wind turbine blade, where said fin has a height measured perpendicular from a base having a width and a thickness and a free end, where the fin is connected to an outer side of said base, and where said fin is delta shaped tapering from a trailing edge side towards a leading edge side and where each of said vortex generator units further comprises a layer of adhesive on an inner side of said base, extending in a base plane, said layer of adhesive extending to an outermost periphery of the base of said vortex generator unit, where the vortex generator unit comprises exactly one fin, and where the base of said vortex generator unit, in a base plane, has an airfoil periphery that is rounded at a leading edge and is rounded at a trailing edge and has rounded peripheral edges connected between the rounded leading edge and the rounded trailing edge of the base, wherein the base of the fin at the leading edge has a width, W-lead, in the base plane, and where the base at the trailing edge has a width, W-trail, in the base plane, and where W-lead is smaller than W-trail.

* * * * *